United States Patent [19]

Kawamura et al.

[11] Patent Number: 4,989,981
[45] Date of Patent: Feb. 5, 1991

[54] AUTOMATIC QUALITY CONTROL MEASURING SYSTEM FOR AUTOMOTIVE ASSEMBLY LINE OR THE LIKE

[75] Inventors: Takaaki Kawamura, Yokohama; Tomoyasu Yamazaki, Tokyo, both of Japan

[73] Assignee: Nissan Motor Co., Ltd., Yokohama, Japan

[21] Appl. No.: 215,708

[22] Filed: Jul. 6, 1988

[30] Foreign Application Priority Data

Jul. 7, 1987 [JP] Japan .................................. 62-167935

[51] Int. Cl.⁵ .............................................. G01B 11/00
[52] U.S. Cl. ..................................... 356/394; 356/376; 356/377
[58] Field of Search ................ 356/376, 377, 394, 353

[56] References Cited

U.S. PATENT DOCUMENTS 4,453,827  6/1984  Taboada ............................. 356/353

Primary Examiner—Léon Scott, Jr.
Attorney, Agent, or Firm—Pennie & Edmonds

[57] ABSTRACT

In order to accurately scan an object for the purposes of determining the dimensions, surface finish or the like, the position of the object according to the measuring system coordinate grid is determined. Using this orientation, the degree of misalignment with respect to a standard position on the grid is determined and the scanning devices which perform the actual measurement, are moved to positions which take the amount of misalignment into consideration and wherein accurate examination is assured.

9 Claims, 5 Drawing Sheets

AUTOMATIC QUALITY CONTROL MEASURING SYSTEM FOR AUTOMOTIVE ASSEMBLY LINE OR THE LIKE

BACKGROUND OF THE INVENTION

1. Field of the Invention

The present invention relates generally to automatic production line quality control and more specifically to an automatic system for measuring various dimensions of a vehicle chassis or similar structure.

2. Description of the Prior Art

In order to alleviate tedious manual work it has been previously proposed to measure the dimensions of a vehicle using a reflected light beam technique. Viz., in order to measure the various dimensions in a manner to determine the accuracy with which the vehicle chassis (or the like structure) has been assembled, the chassis is carefully disposed in a predetermined position in which a predetermined measuring coordinate grid is defined. Measuring devices which are located in predetermined locations of the coordinate grid are then used to scan the structure using laser beams or the like. The data derived from the scanning is then used to develop an image or images which can be compared with blueprint models to determine if the required degree of accuracy has been attained or not.

However, this system has suffered from the drawback that even though care is taken to assure that the chassis is located in exactly the correct position within the coordinate grid, still erroneous readings tend to be produced and the need for manually executed backup checking and the like, to be executed is induced.

SUMMARY OF THE INVENTION

It is an object of the present invention to provide an automatic system which can check the various dimensions of a vehicle chassis (or the like structure) with precision and which eliminates the generation of erroneous data caused by a slight deviation of the structure disposition with respect to the coordinate grid of the check site.

In brief, the above object is achieved by an arrangement wherein, in order to accurately scan an object for the purposes of determining the dimensions, surface finish or the like, the position of the object according to the measuring system coordinate grid is determined. Using this orientation, the degree of misalingment with respect to a standard position on the grid is determined and the scanning devices which perform the actual measurement, are moved to positions which take the amount of misalingment into consideration and wherein accurate dimensional examination is assured.

More specifically, a first aspect of the present invention comes in the form of a system which features: means defining a measuring system coordinate grid; a scanning device, said scanning device being arranged to scan an object located in said measuring system coordinate grid and to produce a signal indicative of the distance of points on the object which is being scanned; means for selectively moving said scanning device from a standard position; a control circuit, said control circuit being operatively connected with said scanning device and said selectively moving means, said control circuit being arranged to: operate said scanning device in said standard position and to analyse the data derived in a manner which determines the location and orientation of said object in said measuring grid; and derive the amount and direction in which said scanning device must be moved before scanning said object for dimensional data.

A second aspect of the present invention is deemed to comprise a method of examining an object comprising the steps of: disposing an object to be examined in a measuring system coordinate grid; scanning the object to determine the location and orientation of said object with respect to said grid; determining the amount by which said object is misaligned with said grid; moving a scanning device to a position which compensates for the misalignment; and scanning the object in a manner to derive dimensional data.

DETAILED DESCRIPTION OF THE PREFERRED EMBODIMENT

Figure 1:
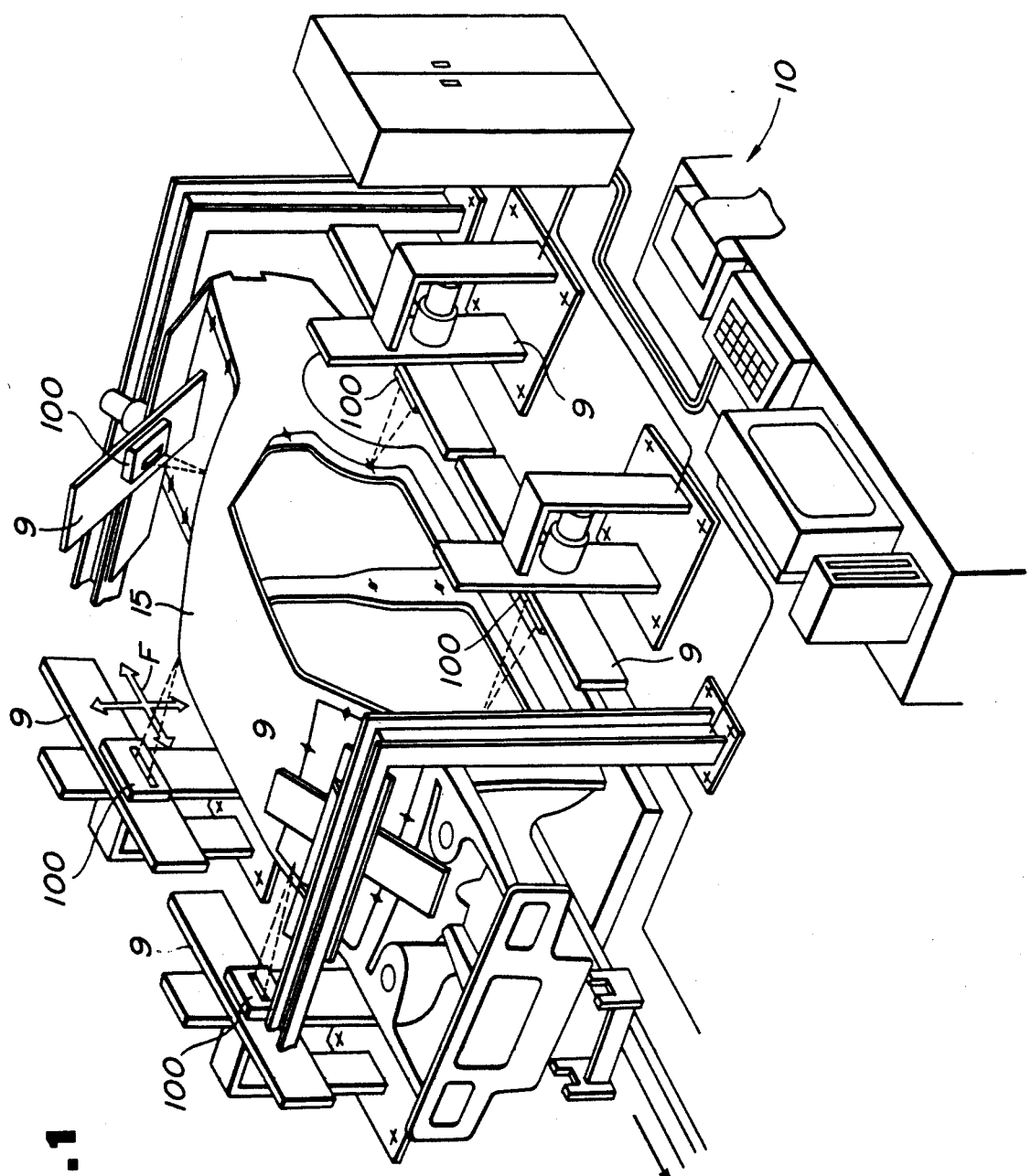
FIG. 1 is a perspective view showing a quality control dimension checking site equipped with a system according to the present invention.
Figure 2:
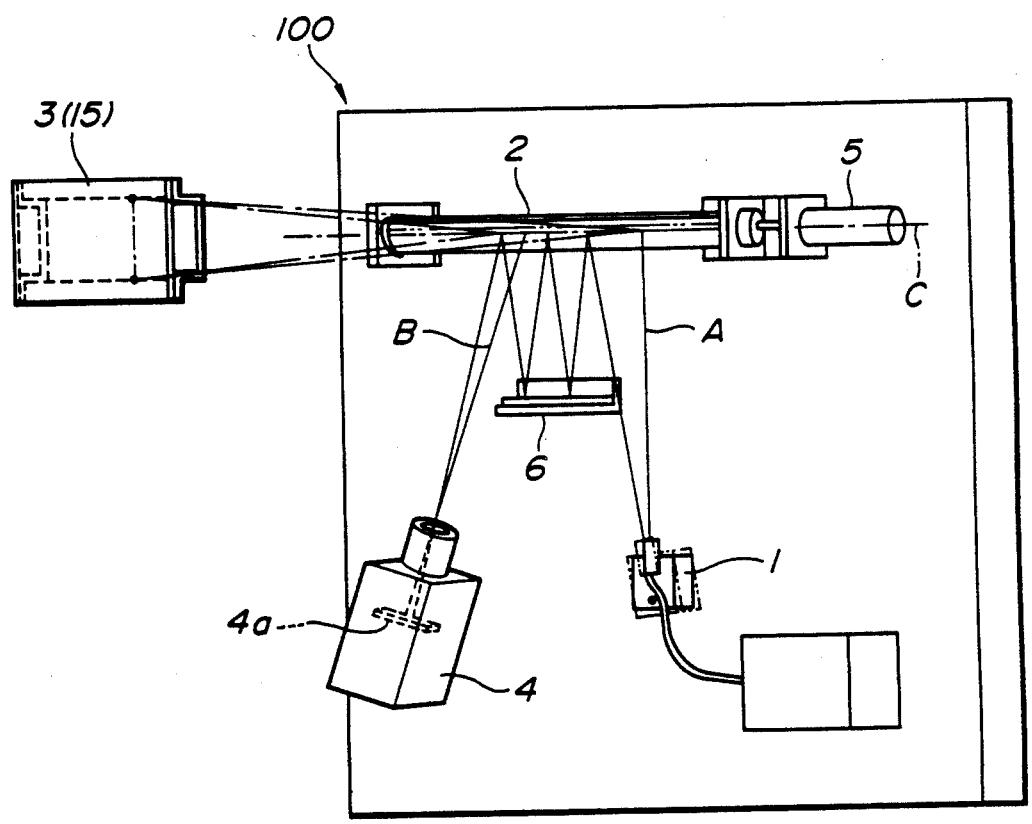
FIG. 2 is a perspective view showing constructional features of laser beam scanning device of the nature used in connection with the instant invention.
Figure 3:
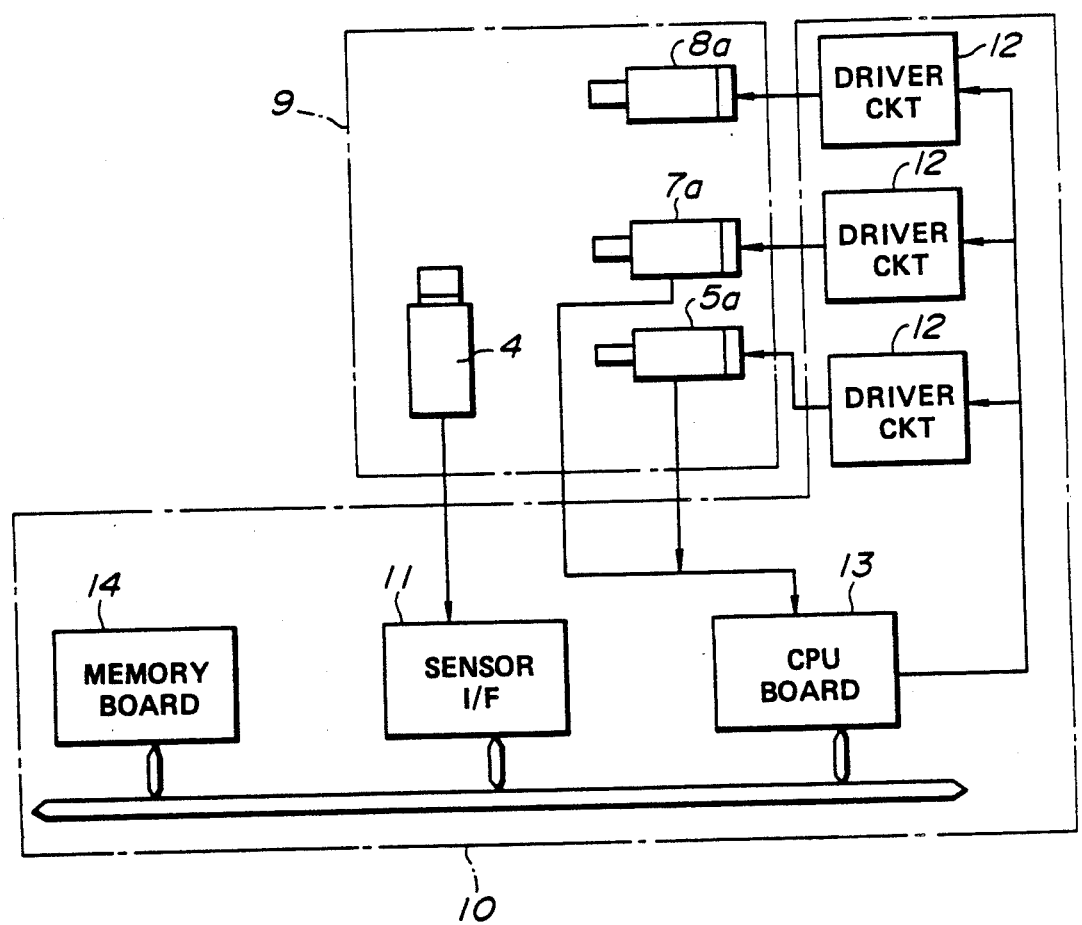
FIG. 3 is a schematic drawing showing the arrangement of various servos and the like which form a vital part of the instant invention.

FIGS. 1 to 3 shows construction details of a system according to the present invention. In this arrangement a plurality of laser beam type scanning devices 100 are arranged around the vehicle in the illustrated manner. In this arrangement a total of 6 units are used. However, the present invention is not limited to this number and more or less can used as deemed suitable for the desired inspection purposes.

The construction and arrangement of each of the scanning devices is shown in FIGS. 2 and 3. As shown in these figures, each of the devices 100 includes a laser source 1 which in this embodiment takes the form of a semiconductor type laser. The source 1 is arranged to produce a beam of coherent light A which is directed against an object 3 (in this instance the vehicle chassis 15) after being reflected off a first mirror 2. In this arrangement the mirror 2 is arranged to be selectively rotatable about an axis C. The reason for this arrangement will become more clearly appreciated hereinlater.

The beam B which is reflected off the chassis 15 is again reflected by the first mirror 2 and directed toward a photo responsive pickup 4. This pick up includes a single dimensional photo responsive element 4a. By determining the point on the photo responsive element 4a the reflected beam impinges it is possible to determined the distance of the point on the object on which the beam laser is impinging and being reflected.

This arrangement further includes a scanning control mechanism 5. This mechansim includes a scanning servo motor 5a which is arranged to rotate the mirror 2 about the axis C. The rotational motion induced in the mirror by the servo 5a is such as cause the laser beam to scan through an angle twice the rotational angle through which the mirror is moved—see arrow D in FIG. 2. The above mentioned rotational motion also causes the reflected beam B to undergo a similar type of deflection.

A second mirror 6 is disposed so as to be disposed opposite the first mirror 2 when the latter is rotated to a position wherein it is opposite the laser source 1 and the pickup 4. This arrangement defines an opposed mirror system which elongates the light path and increases the accuracy of the optical axis defined between the laser source 1 and the pickup 4.

A scanning direction control servo 8a is operatively connected with the laser source 1 and arranged to selectively swing the source through a predetermined angle when energized.

The above described distance detecting arrangements 100 are each mounted on a position adjustment device 9 which includes two position adjusting servo motors 7a. These servo motors are capable of moving the position of the detectors in two mutually perpendicular directions through suitable intermediate mechanisms as indicated at F. Viz., vertically and horisontally.

Each of the position adjustment devices 9 are operatively connected to a control device 10. In this embodiment the control device 10 includes a sensor interface (I/F) 11 which is arranged to receive the inputs from each of the photo responsive elements 4a; a CPU board which arranged to produce servo motor control commands based on the data input and apply these commands to each of the servo motors 5a, 7a and 8a through driver circuits 12; and a memory board 14 which holds the data and/or programs used and/or accumulated during the operation of the system. Note that in FIG. 3 only one of the two servo motors 7a is shown for simplicity of illustration.

Each of the motors 5a, 7a, and 8a includes an encoder which monitors the operation of the motor and issues a signal indicative of amount by which the motor has moved the respective devices from a default or standard position. The position indicating encoder signals are fed back to to the CPU board 13 wherein they are suitably received and placed in memory.

Figure 4:
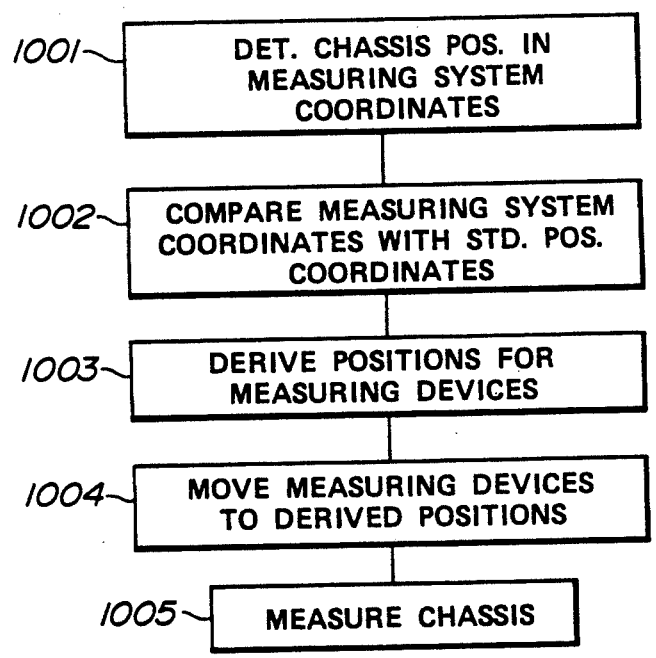
FIG. 4 is flow chart-like block diagram depicting the basic operations performed in connection with the execution of the instant invention.
Figure 5:
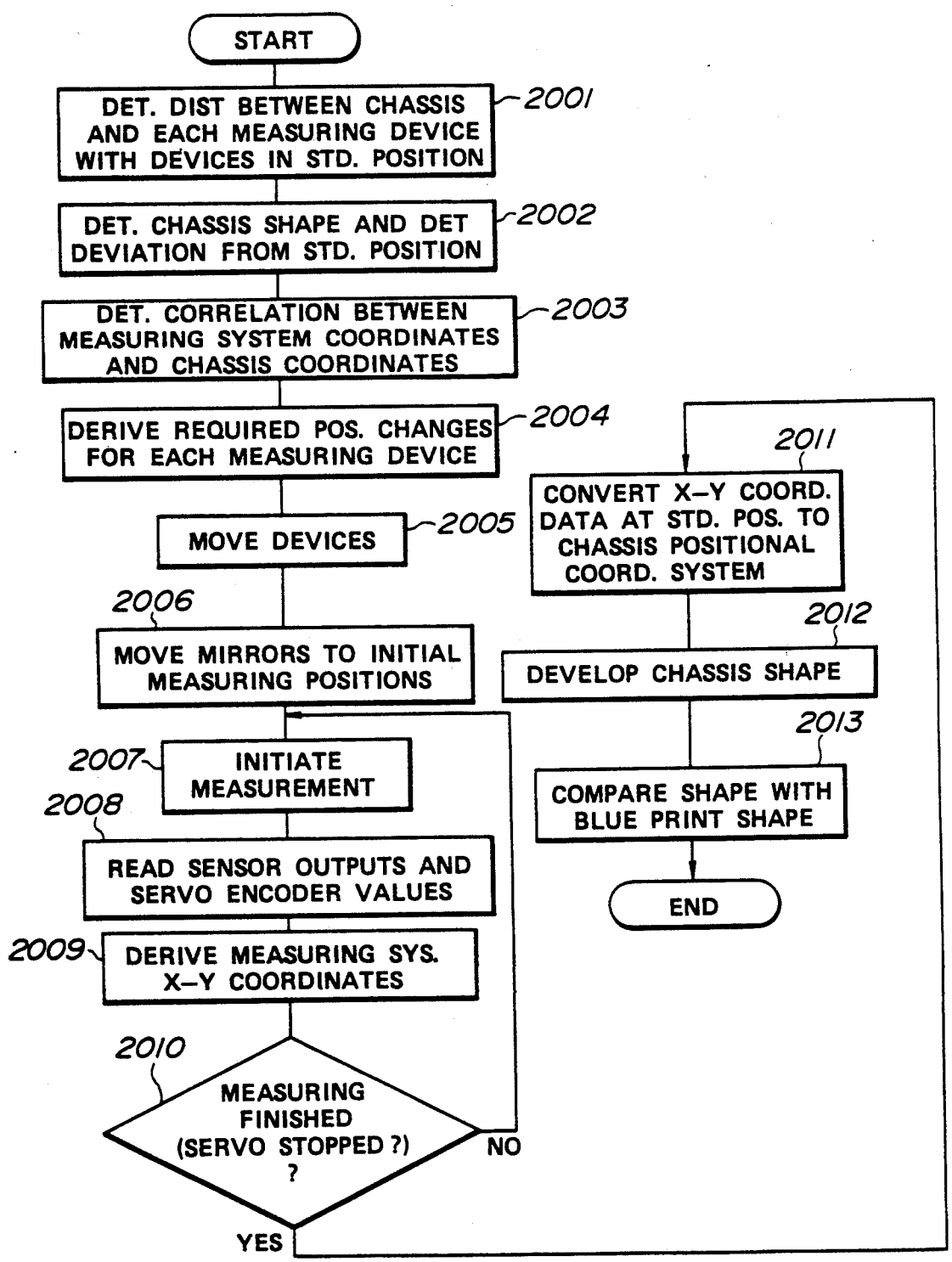
FIG. 5 is a flow chart showing in detail the steps which characterize the operation of the present invention.

The concept and operation of the above described arrangement is shown in FIGS. 4 and 5.

FIG. 4 outlines the basic control provided by the instant invention. The operational steps 1001 to 1005 will become more clearly understood as a description of the flow chart shown in FIG. 5 is made hereinunder.

When the chassis 15 is first moved into position to be measured, all of the measuring devices are conditioned to assume their respective predetermined standard or default positions.

Each of the devices are then energized in a manner to scan the chassis 15 and to detect the distance between each of the devices and predetermined points 15a defined on the portions of the chassis 15 under examination (step 2001). The data which is fed to the control device 10 is then used to develop a number of spatial image points which are inconnected and used to develop an outline image of the chassis (step 2002).

At this stage, the thus developed outline image is compared with one wherein the chassis is perfectly located and the amount of deviation therefrom determined. This enables the amount by which the chassis is misalinged with the coordinate grid of the measuring system to be determined (step 2003).

At step 2004 the amount and direction in which each of the scanning devices 100 must be moved in order compensate for the misalignment (if any) and to place them in the optimum position for examining the dimensions of the chassis is calculated and in step 2005 commands are issued to the driver circuit 12 which induce the required movement from the respective standard positions to the calculated ones.

With the scanning devices 100 conditioned to assume the newly calculated positions, the first mirror 2 of each of the measuring devices is moved to an initial measuring position and dimension measuring (scanning) is initiated (step 2007).

The measurement of the various dimensions of the chassis are carried out by reading the outputs of the photo responsive element 4a and the encoder of the servo motor 5a and recording polar coordinate data in terms of distance and rotational angle, at predetermined mirror angles until the mirror 2 has moved from its initial position a terminal one (step 2008). Using this X-Y data a plurality a cross-sectional images (one for each predetermined measuring point 15a) are developed.

According to the present invention, as the angle of the laser beam A can be varied by suitably energizing the servo 8a as well as moving the position of the scanning devices as whole, these cross-sectional images are developed with the scanning devices placed in the most appropriate position for taking the required measurements, and therefore accurately reflect the actual shape and dimensions of the chassis under examination.

When all of the measuring operations are complete the process goes to step 2001 wherein the plurality of cross-sectional images are arranged with respect a coordinate system defined by the chassis and in step 2012 a three dimensional image which depicts the shape of the chassis is developed. This image is compared with a blue print version in a manner which reveals any unacceptable deviations in manufacturing accuracy.

As will be appreciated this process is highly suited to programmed control and thus can very easily be render completely automatic.

It should be noted that the invention is not limited to using the position adjusting arrangements to move the measuring devices to a single position and that upon the completion of one set of measurements in one adjusted position the devices can be moved to other adjusted positions in a manner to increase the number of cross-sectional images which can be developed and used in the compilation of the final shape.

The invention is not limited to dimensional control and can also be applied to panel inspection (by way of example). Viz., the panels which define visible parts of the vehicle can be inspected for flaws, wrinkles caused by improper pressing and the like.

That is to say, once having determined the orientation of the chassis with respect to the measuring system coordinate grid and having relocated the scanning devices so as compensate for the deviation, accurate scanning and measuring is assured.

What is claimed is:

1. In a system for measuring dimensions of an object such as a vehicle chassis,
    means defining a measuring system coordinate grid;
    a scanning means, wherein said scanning means includes a coherent light scanning device, for scanning an object located in said measuring system coordinate grid and producing a signal indicative of the distance from said scanning device to a plurality of points on the object which is being scanned;

means for selectively moving said scanning device from a standard position; and control circuit means which operates said scanning device in said standard position and, based on the output of said scanning device determines the location of a set of reference points on said object and, based on said determined reference point locations, calculates the orientation of said object in said measuring grid, and based on said calculated orientation, derives the amount and direction in which said scanning device must be selectively positioned before scanning said object for dimensional data, and actuates said selective moving means to move said scanning device in a manner corresponding to said derived amount and direction, thereby compensating said scanning means for said calculated object orientation when said scanning means scans said object for dimensional data.

2. A system as claimed in claim 1 wherein said control circuit is arranged to:

induce said selectively moving means to move said scanning device to assume a position in which accurate dimensional scanning can be executed;

induce said scanning device to scan said object;

read the outputs of said scanning device in a manner to develope an image which can be compared with a predetermined standard image.

3. A system as claimed in claim 1 further comprising a second scanning device, said second scanning device being mounted on selective moving means and operatively connected with said control circuit.

4. A system as claimed in claim 1 wherein said scanning device comprises:

a laser source for emitting a laser beam;

a mirror for reflecting the laser beam emitted by said laser source toward said object, wherein said laser source and said mirror are arranged so as to establish a laser beam light path from said laser source to said mirror and incident at an angel with said mirror;

a mirror servo for selectively moving said mirror about an axis; and a light responsive pickup, said light responsive pickup being arranged to produce a signal indicative of the position and intensity of the reflected laser beam.

5. A system as claimed in claim 4 further comprising a laser source servo, said laser source servo being arranged to selectively control the angle at which the laser beam is directed toward said mirror.

6. A system as claimed in claim 4 further comprising a second mirror, said second mirror being arranged with the first said mirror in a manner to define an opposed mirror system which increases the length of the light path between said laser source and said pickup.

7. A system as claimed in claim 1 wherein said selectively moving means comprises;

first and second position control servos, said first and second position control servos being arranged to selectively move the scanning device supported therein in first and second mutually opposite directions.

8. A method of examining an object comprising the steps of:

disposing an object to be examined in a measuring system coordinate grid;

scanning the object to determine the location of a set of reference points on said object;

calculating the orientation of said object with respect to said grid based on said determined reference point locations;

moving a scanning device to a position which compensates for said calculated orientation; and scanning the object in a manner to derive dimensional data.

9. A method as claimed in claim 8 further comprising the step of:

using the dimensional data to complile a plurality of cross sectional images combining the cross-sectional images to develop a total image; and comparing the total image with a predetermined image in a manner to determine the amount of deviation between the two.

* * * * *